United States Patent
Lohring et al.

[15] 3,645,083
[45] Feb. 29, 1972

[54] SPINDLE-MOUNTING ASSEMBLY FOR THREAD-SPINNING OR THREAD-TWISTING MACHINES

[72] Inventors: Theo Lohring, Bentheim; Aloys Greive; Heinrich Eckholt, both of Munster; Theodor Tiemann, Bosensell/Munster, all of Germany

[73] Assignee: Hamel GmbH Zwirnerei-und Spinnereimaschinen, Munster, Westf., Germany

[22] Filed: Jan. 5, 1970

[21] Appl. No.: 603

[30] Foreign Application Priority Data

Jan. 7, 1969 Germany..................P 19 00 607.6

[52] U.S. Cl................................57/88, 57/100, 57/132, 57/135
[51] Int. Cl.....................D01h 7/08, D01h 1/24, D01h 7/22
[58] Field of Search................57/88, 132, 92, 102, 100, 129, 57/130, 133, 134, 135; 57/88, 132, 92, 102, 100, 129, 130, 133, 134, 135

[56] References Cited

UNITED STATES PATENTS

| | | | |
|---|---|---|---|
| 2,803,106 | 8/1957 | Lindemann et al. | 57/88 |
| 2,972,219 | 2/1961 | Collins | 57/88 |
| 3,364,670 | 1/1968 | Stiepel et al. | 57/88 |

*Primary Examiner*—John Petrakes
*Attorney*—Karl F. Ross

[57] ABSTRACT

A spindle-mounting assembly for thread-spinning or thread-twisting machines in which the spindle shaft is journaled about an upright axis in a bearing sleeve and is coaxially surrounded by a clutch bell. The clutch bell is spring biased to bring its transverse annular clutch face into engagement with a drive pulley coaxially surrounding the clutch bell but may be drawn downwardly by an electromagnet surrounding the bearing sleeve to engage a brake face. Between the cylindrical sleeve of the clutch bell and the drive pulley there is provided a fixed boss or sleeve to which the inner race of the outer roller or ball bearing system is affixed so that the roller elements are constantly in motion when the pulley is driven, regardless of the clutch position.

11 Claims, 6 Drawing Figures

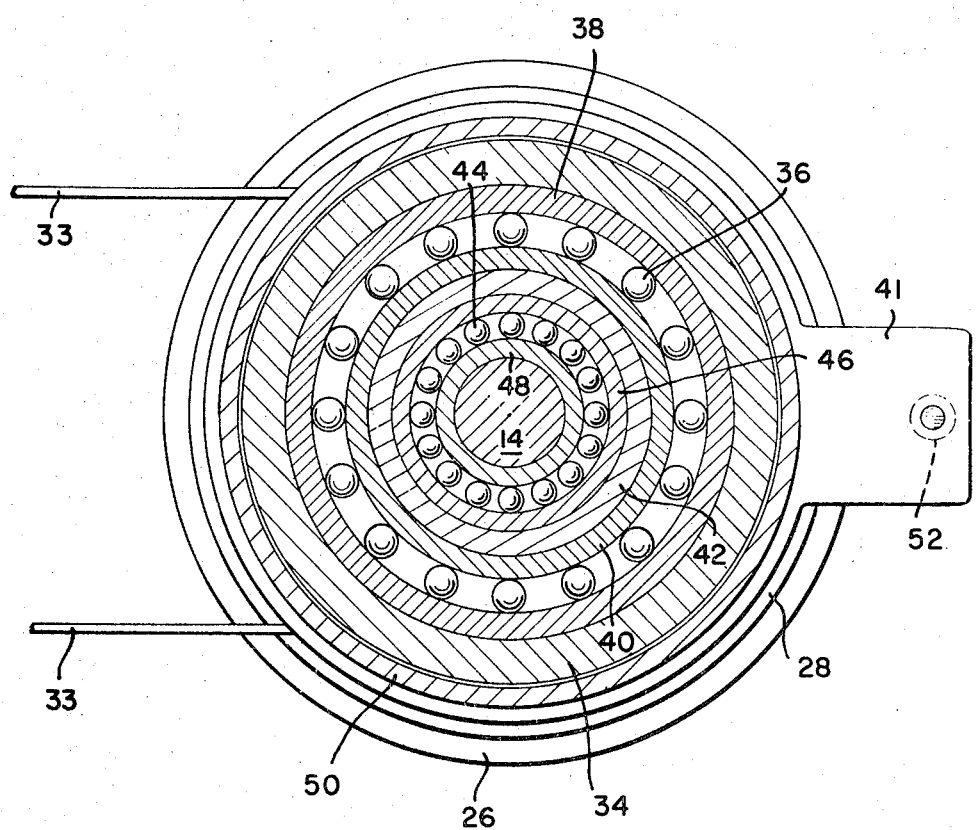
FIG. I A

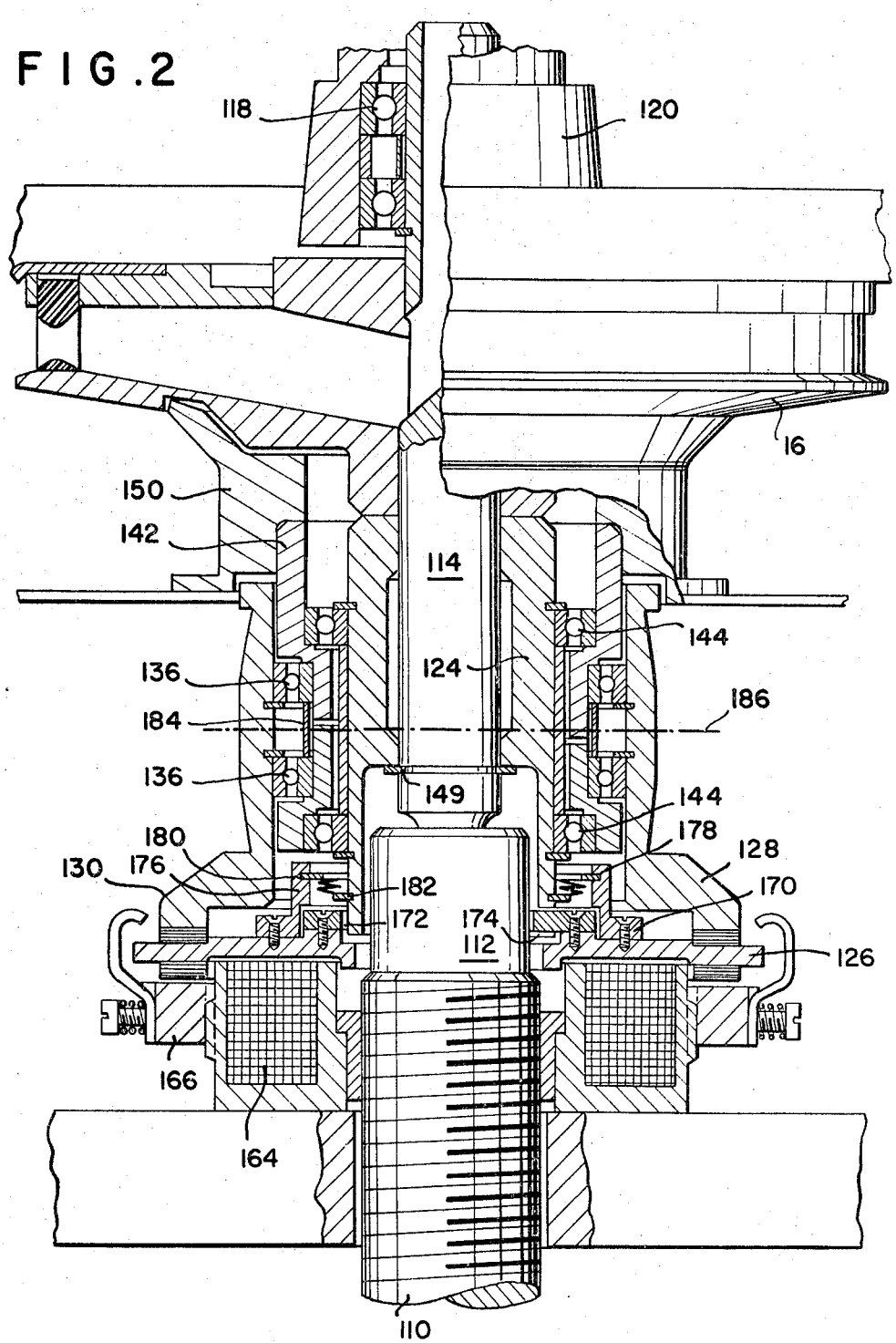

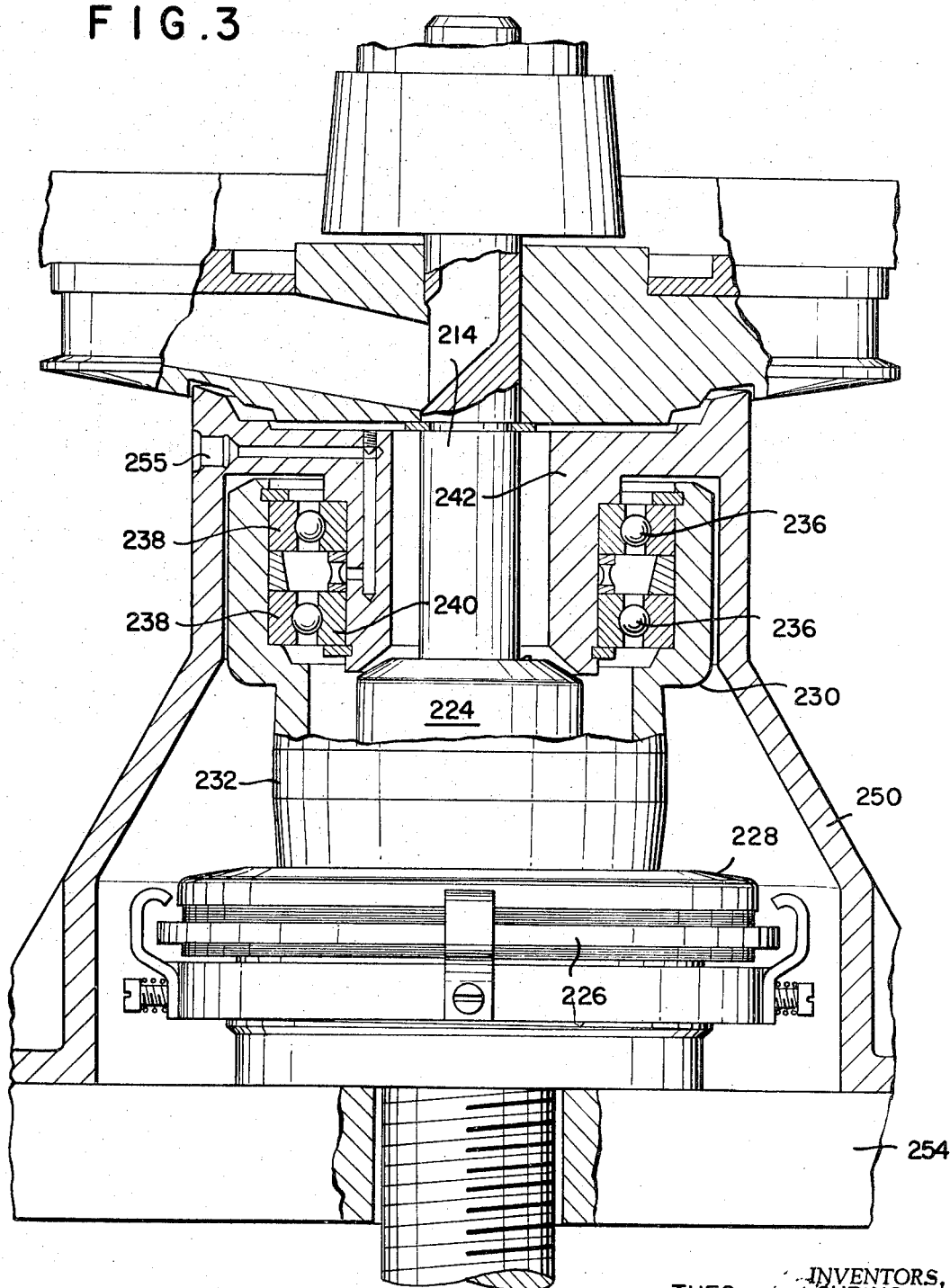

Patented Feb. 29, 1972

INVENTORS,
THEO LÖHRING
ALOYS GREIVE
BY HEINRICH ECKHOLT
THEODOR TIEMANN

*Karl F. Ross*
ATTORNEY

Patented Feb. 29, 1972

INVENTORS,
THEO LÖHRING
ALOYS GREIVE
BY HEINRICH ECKHOLT
THEODOR TIEMANN

Karl F. Ross
ATTORNEY

SPINDLE-MOUNTING ASSEMBLY FOR THREAD-SPINNING OR THREAD-TWISTING MACHINES

FIELD OF THE INVENTION

The present invention relates to a mounting assembly for a spindle adapted to carry a spool in a yarn-twisting or yarn-spinning machine.

BACKGROUND OF THE INVENTION

A thread twisting or spinning machine generally has a plurality of driven spindles on which cores are mounted for winding up or giving off thread. In one type of such a machine a pair of spools of thread are mounted coaxially on one hollow driven spindle. A filament from each spool is drawn down through the spindle, out through a rapidly rotating flyer angularly fixed on the spindle, and up in a so-called "ballon" around the yarn package so that they are given a twist as they pay off from the yarn package. The flyer and spindle are driven by a belt, with all the belts of an entire spindle bank being driven from a common source.

The principles described immediately above are fully set out and illustrated in the commonly assigned, copending applications Ser. No. 810,464 filed Mar. 26, 1969 by A. Greive and A. Treus under the title "Method of and Apparatus for Spinning and Treating Thread"; now U.S. Pat. No. 3,563,019) Ser. No. 814,065 filed Apr. 7, 1969 by A. Grieve under the title "Belt-Type Drive Arrangement"; and Ser. No. 818,481 filed Apr. 23, 1969 under the title "Threading Arrangement for Spinning and Twisting Machines" (now U.S. Pat. No. 3,552,111).

These machines customarily have a coaxially rotatable drive pulley and drive shaft, the latter being coupled to the flyer. A clutch is provided for rotationally connecting the two together for twisting, and for disconnecting them when a new package must be set on. In order to permit the two to turn relative to each other, a rolling-element bearing—i.e., a roller, ball, or needle bearing—is usually provided between them. It has been found that this bearing has a relatively short service life, owing in large measure to the lack of relative rotation of the parts of the bearing when the spindle runs at the speed of the driving pulley.

When the spool of an empty yarn package must be removed from the spindle, there is often considerable pulling and prying which damages the bearing. Such prying ruins the bearing because the stop means which takes up this strain by restraining axial displacement of the spindle usually engages the drive pulley so that any axial stresses must be transmitted through the bearing.

Bearings of such devices are also subjected to bending moments as the drive pulley receives radial force from the drive belt.

OBJECTS OF THE INVENTION

It is, therefore, an object of the present invention to provide an improved mounting assembly for the spindle of a thread-twisting or thread-spinning machine.

Another object is to provide such an assembly wherein the bearing is less subject to strain and wear and has a longer service life.

SUMMARY OF THE INVENTION

This invention is based on the recognition that rolling-element bearings, in the systems described, have worn excessively in the past because they remain without relative movement between the two races, with the elements not rolling, when the drive pulley is clutched to rotate the spindle, i.e., during normal operation.

A roller or ball bearing soon becomes useless if it is subjected to continuous or prolonged radial strain with the balls or rollers in relatively unchanged positions along the races. In such condition, the ball or roller may form a corresponding depression in one or the other race, thereby decreasing the effectiveness of the bearing.

According to a feature of the present invention, the drive pulley is mounted on rolling element bearings which, rather than riding on the spindle shaft, ride on a relatively fixed part of the assembly. In this manner the bearing carrying the drive pulley is in motion as long as the drive is actuated.

According to another feature of the invention, a second rolling-element bearing is provided between this shaft and the annular, angularly fixed body.

In accordance with yet another feature of the invention, there are two roller bearings between the annular fixed body and the driven member, these bearings being symmetrically arranged to either side of a plane of symmetry corresponding to the center of the drivebelt or the surface engaged thereby. The same arrangement can be provided for the bearings between the annular body and the shaft, if any.

A further feature of the present invention provides that the clutch comprises a clutch disk which is limitedly axially displaceable relative to the shaft, but rotationally coupled thereto. The outer drive member is engageable by this disk. A spring biases the two into coupling engagement, while an electromagnet can be actuated to pull the disk out of engagement and into engagement with a braking surface to arrest the spindle fully.

Yet another feature of the invention is the provision of stop means in the form of a plurality of small fixed hooks which are engageable with the clutch disk on upward axial displacement of same. These spring-biased hooks thus prevent axial displacement of the spindle virtually directly, without acting through an axially weak ball bearing. Furthermore, they are displaceable out of the way to permit quick and simple dismounting of the unit.

In summary, therefore, the spindle assembly for a thread-spinning or thread-twisting machine, according to this invention, comprises an upright spindle rotatably received in a fixed bearing sleeve carried by the spindle bank or beam. This shaft is formed with a spinning assembly of the character previously described. Coaxially surrounding the shaft and, generally, the upper end of the bearing sleeve, is a clutch bell having cylindrical boss, the upper end of which is keyed to the shaft for axial movement there along, while rotatably entraining this shaft. The lower part of this boss is spring biased upwardly, is provided with an outwardly extended annular flange lying in a plane perpendicular to the axis of this shaft, whose upper clutch face is engageable with the drive pulley while the lower clutch face is engageable with a fixed brake surface of the spindle bank. Associated with and preferably coaxially surrounded by the fixed braking surface, is an annular electromagnet or solenoid adapted to draw the clutch bell axially downward and free the upper clutch face from the drive pulley while bringing the lower clutch face into engagement with the braking surface.

The drive pulley, which coaxially surrounds at least the cylindrical boss of the clutch bell and may coaxially surround the bearing sleeve or the spindle shaft, or both, is provided according to the essential feature of this invention, with rolling-element bearing means having an outer race fixed to the pulley. The inner race of this bearing means is fixed to a permanently nonrotatable sleeve or intermediate ring which is coaxial with the pulley and is interposed between the latter and the cylindrical boss of the clutch bell. Consequently, the rolling elements of the bearing, one of the races of which is angularly fixed to the intermediate ring or sleeve while the other is angularly fixed to the pulley, are continuously in motion as long as the pulley is driven regardless of the position of the clutch. It is evident that the intermediate ring need not withstand substantial lateral force, especially when, in addition to the bearing means between the intermediate sleeve and the pulley, there is provided a bearing means between the spindle shaft and the intermediate ring, both bearing means being generally in the same horizontal plane perpendicular to the shaft axis or at least symmetrical thereabout. Under these circumstances, the intermediate sleeve need not be formed as a massive structure since it does not absorb substantial force and may simply depend from a fixed part of the spindle bank and be held against angular movement of rods, pins or the like. Advantageously the intermediate sleeve or ring forms part of a lubricating structure for one or the other of the bearing means.

It will be appreciated that the intermediate sleeve need not directly surround the cylindrical boss of the clutch bell as is the preferred case, but may be axially offset therefrom to a slight extent. In the axially offset case the second bearing means is provided between the spindle shaft itself and the inner wall of the intermediate sleeve.

DESCRIPTION OF THE DRAWING

The above and other objects, features, and advantages of the present invention will become apparent from the following description, reference being made to the accompanying drawing, in which:

FIG. 1A is a cross section taken along line IA—IA of FIG. 1; and

FIGS. 2–5 are sections similar to FIG. 1 showing four other embodiments of the present invention.

SPECIFIC DESCRIPTION

Figure 1:
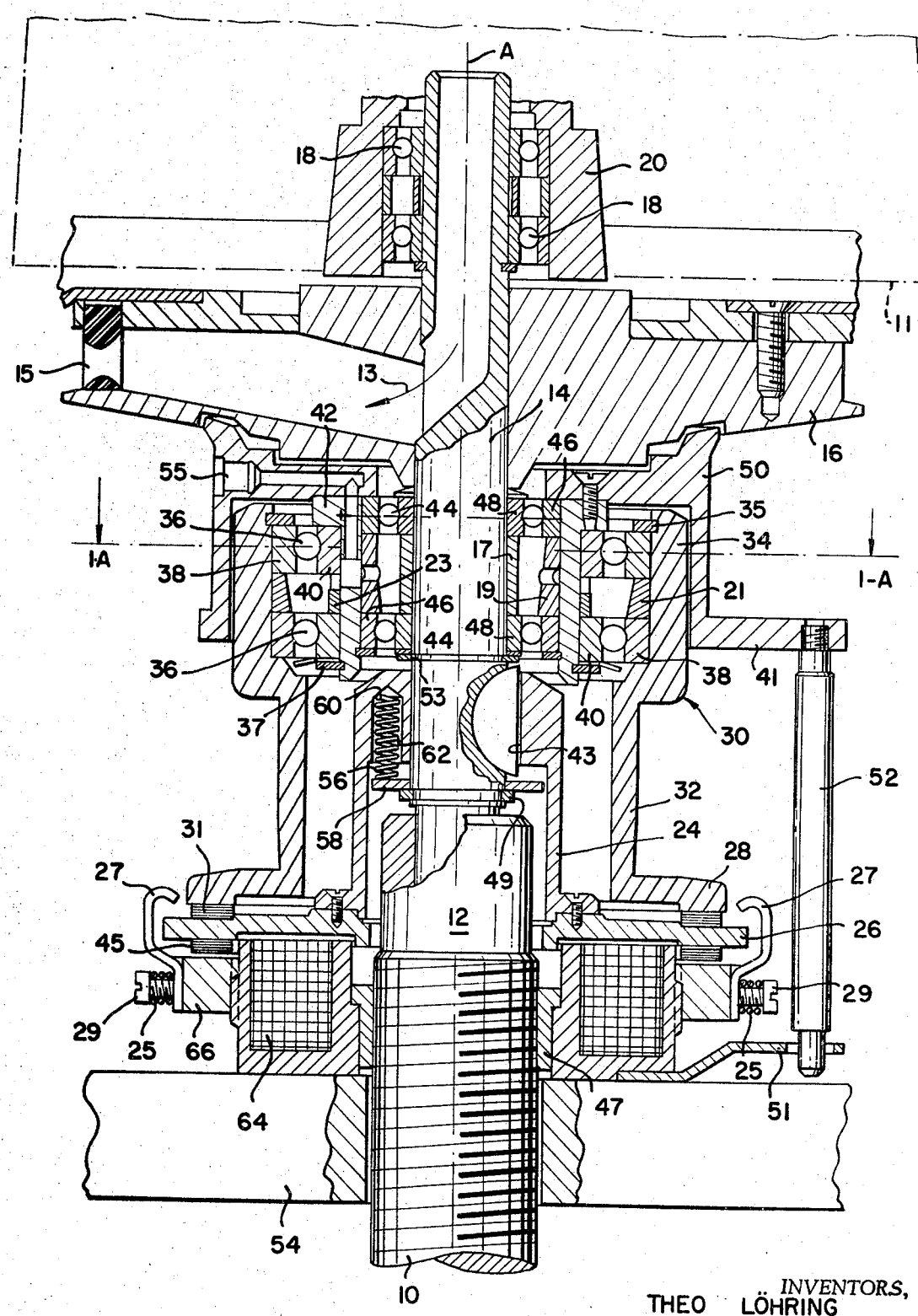
FIG. 1 is a longitudinal section through a first embodiment of the present invention.

As shown in FIGS. 1 and 1A, the mounting assembly comprises a fixed baseplate 54 in which a sleeve 10 holding a brass bearing 12 is mounted. This plate 54 carries a bank of spindle assemblies. A spindle shaft 14 carries a spool-mounting sleeve 20 which is adapted to receive a generally frustoconical yarn package partially shown by dot-dash line 11. Filaments from this package 11 are drawn down through the shaft and out through a low-friction (e.g., Teflon) washer 15 in the flyer as shown by the arrow 13 according to the methods of the above-cited applications.

The shaft 14 further carries, separated by a sleeve 17, the inner races 48 of two axially spaced ball bearings 44 which are held in place by a snap ring 53 and the flyer 16. A sleeve 42 carries the outer races 46 of these bearings 44, spaced apart by a ring 19. This sleeve 42 is fixedly mounted by screws on a member 50 formed with a radially extending arm 41 carrying an axially extending rod 52 whose lower end is engageable in a hole in a plate 51 mounted on the plate 54. In this manner, the sleeve 42 is held against rotation.

An annular member 30 axially in line with and spaced radially outward from the shaft 14 and sleeve 42 has an upper portion 34 mounting axially spaced ball bearings 36 whose outer races 38 are spaced on the portion 34 by a ring 21 and whose inner races 40 are axially spaced on the sleeve 42 by a ring 23, snaprings 35 and 37 preventing axial displacement of these bearings. Oil or grease can be injected through a hole 55 in the fixed member 42 to lubricate all four ball bearings 36 and 44 simultaneously. The member 30 is formed with a surface 32 adapted to be engaged by a flat belt 33 (FIG. 1A).

The shaft 14 also carries a key 22 which engages in an axial groove 43 of a further sleeve or clutch bell 24. This sleeve 24 is formed with a plurality of bores 62 in which compression springs 56 (only one shown) are precompressed between the base 60 of the bore 62 and a washer 58 held on the shaft 14 by a snapring 49. In this manner, the sleeve 24 is strongly biased upwardly relative to the shaft 14 and is angularly fixed relatively thereto while being axially displaceable thereon. A ferromagnetic clutch disk 26 is screwed to the lower end of this sleeve 24 and carries on its opposite faces two annular clutch friction elements 31 and 45. The upper friction ring 31 normally engages a flange portion 28 of the member 30, and the lower ring 45 is engageable with a braking ring 66 carried by an electromagnet 64.

This braking ring 66 further carries a plurality of hooks 27 which are mounted on screws 29 and inwardly biased by springs 25. These hooks 27 are engageable with the top of the disk 26.

In normal operation the electromagnet 64 is not actuated so that the springs 56 push the clutch disk 26 up into engagement with the flange portion 28, thereby rotationally coupling the drive body 30 and the spindle shaft 14 through the intermediary of the sleeve 24 and the key 22. Thus, as the belt 33 is driven, the shaft 14 is rotated. The races 46 and 48 of the inner bearings 44 and the races 38 and 40 of the outer bearings 36 move relative to each other, with races 40 and 46 fixed. Because of this rotation these bearings 36 and 44 wear very little.

In order to change the yarn package, the electromagnet 64 is actuated to move the clutch plate 26 and the element 31 out of contact with the flange 28 and the element 45 into contact with the fixed braking ring 66. The shaft 14 is therefore arrested while the body 30 continues rotating under the effect of the belt 33. There is, in this condition, no relative movement of the races 46 and 48 of the inner bearing 44; however, since the duration of the stop periods is very small relative to that of the rotating periods, this has little detrimental effect.

With the shaft 14 arrested, the empty core is lifted off. If, as is often the case, this core or spool is wedged on the sleeve 20, the entire assembly is lifted as the empty spool 11 is pulled upwardly. As it is lifted first the hooks 27 engage the disk 26 and prevent further axial displacement thereof, then the washer 58 will bottom on the sleeve 24 to prevent further axial displacement of the shaft 14 relative to this sleeve 24, and further lifting of the spindle 14 is impossible. Thus, the spool can be pried off, if necessary, without putting a strain on the bearings 44 or 36. Of course, for servicing, the hooks 27 can be moved aside and the entire assembly simply lifted off the plate 54.

In this embodiment, the clutch bell 24, 26 is axially offset from the intermediate sleeve 42 which is provided with bearings 44 between the spindle shaft 14 and this angularly fixed sleeve. In substantially the same horizontal plane transverse to the axis A, or at least symmetrically to this plane, is provided the outer bearings 36, etc., between the pulley 30 and the sleeve 42. Consequently, there is no significant force on the sleeve which is supported between the two bearing assemblies.

The embodiment of FIG. 2 operates in a manner identical to that of FIGS. 1 and 1A, and similar parts have been given the same reference numerals increased by 100.

The principal difference between this embodiment and that of FIG. 1 is that the sleeve 124 is press fitted on the shaft 114, axially restrained by a snapring 149, and the bearing 144 and 136 are symmetrical about a plane of symmetry 186 passing through the center of the surface 132 engaged by the belt.

The clutch disk 126 is screwed to a ring 176 which has a snapring 180 that serves as one axial abutment for a stack of dished washers 178 (a belleville spring) also resting on a snapring 182 fitted in the sleeve 124 to urge the clutch disk upwardly. This disk 126 is further screwed to a ring 170 having teeth 172 engaging with teeth 174 on the sleeve 124. In this manner the disk is axially displaceable to a limited degree relative to the sleeve 124, which effectively forms part of the shaft 114, while being angularly fixed relative thereto.

The sleeve 142 is here fixed in a body 150 which is fixedly mounted to a cover plate 152 of the spindle bank and is, therefore, nonrotatable. In order to make the assembly as compact as possible, the bearings 136 and 144 overlap each other radially. The sleeve 142 is radially stepped so that, in order to mount these bearings 136 and 144, it is sectioned at 184.

In this arrangement, the cylindrical boss 124 of the clutch bell is directly surrounded by the pulley 132 so that the inner bearing assemblies 144 are located between the intermediate sleeve 142 and the clutch bell. As is the case with all of the embodiments of this invention, the outer bearing assemblies 136 are provided between the pulley 132 and the sleeve 142, which does not therefore have to withstand significant lateral stress or a net lateral stress.

Such an assembly is extremely advantageous since there is no nonradial stress placed on the bearings caused by the belt, while it is extremely compact. In all other respects, it is identical with the embodiment of FIGS. 1 and 1A.

The FIG. 3 shows an embodiment of the mounting assembly which closely resembles that of FIGS. 1 and 1A except that no bearings are provided between the shaft 214 and the sleeve 242. Parts similar in function to those of FIG. 1 bear the same reference numerals, increased by 200.

The other major difference is that the sleeve 242 is unitarily formed with a housing 250 substantially surrounding the assembly so that an extremely simple and sturdy construction is attained.

Such an arrangement is advantageous because the shaft 214 is virtually always connected to the body 230. Since the plate 226 extends perpendicularly to the shaft 214 and the flange portion 228 extends perpendicular to the body 230, which itself is coaxial with the shaft 214, when the two are engaged they will forcibly be in line. Such as assembly, thus, is very inexpensive to manufacture, the bearings 236 will wear very little for the reasons given above.

In this embodiment, as in the embodiment of FIG. 1, the sleeve 242 may be axially offset from the cylindrical portion 224 of the clutch bell. Here, however, the sleeve 242 is sufficiently massive to absorb lateral stress and no bearing is provided between the sleeve 242 and the spindle shaft 214. The bearings 236 are, however, provided between the pulley 232 and the sleeve 242.

Figure 4:
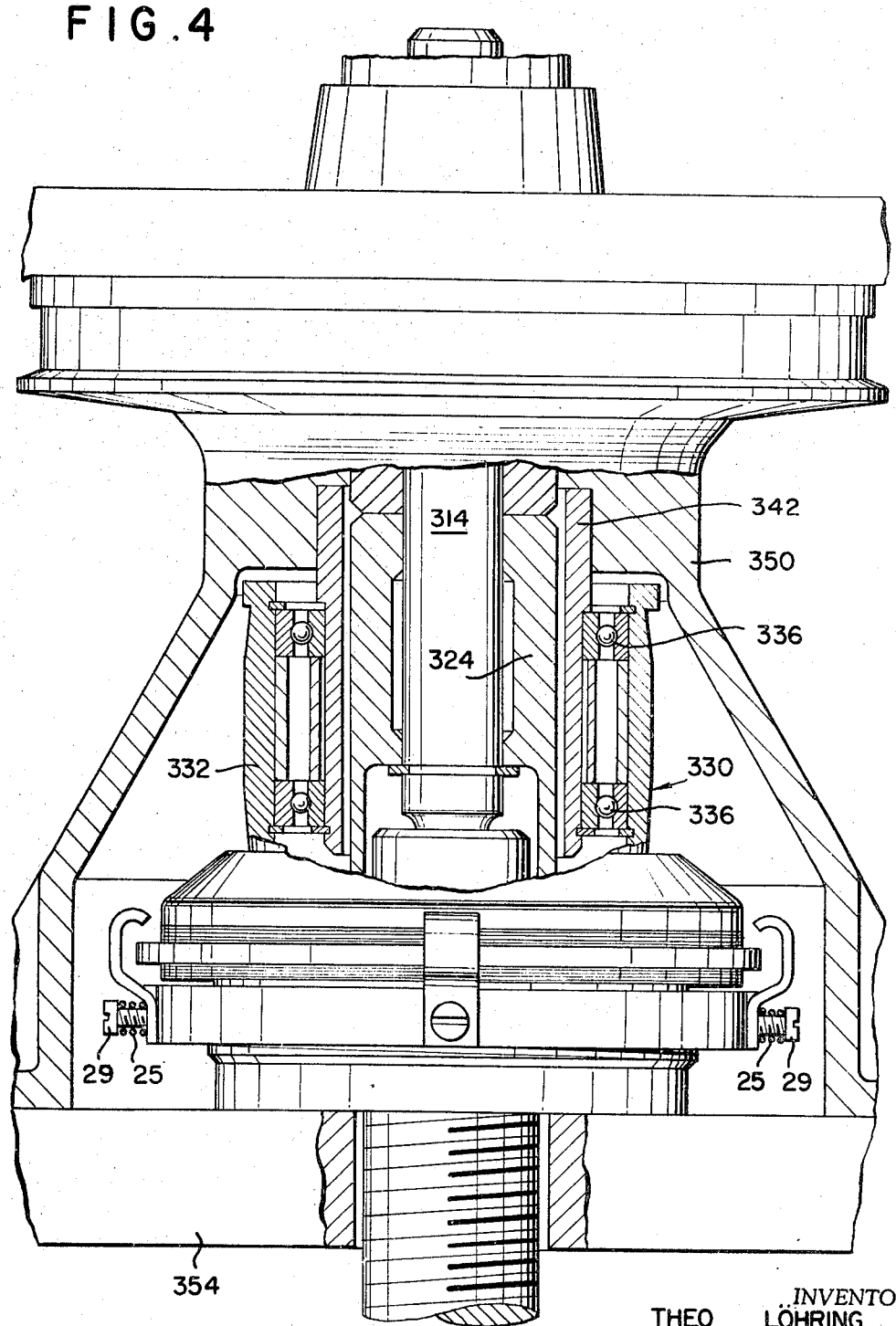

In FIG. 4 the reference numerals of FIGS. 1 and 1A are reused, increased by 300.

Figure 5:
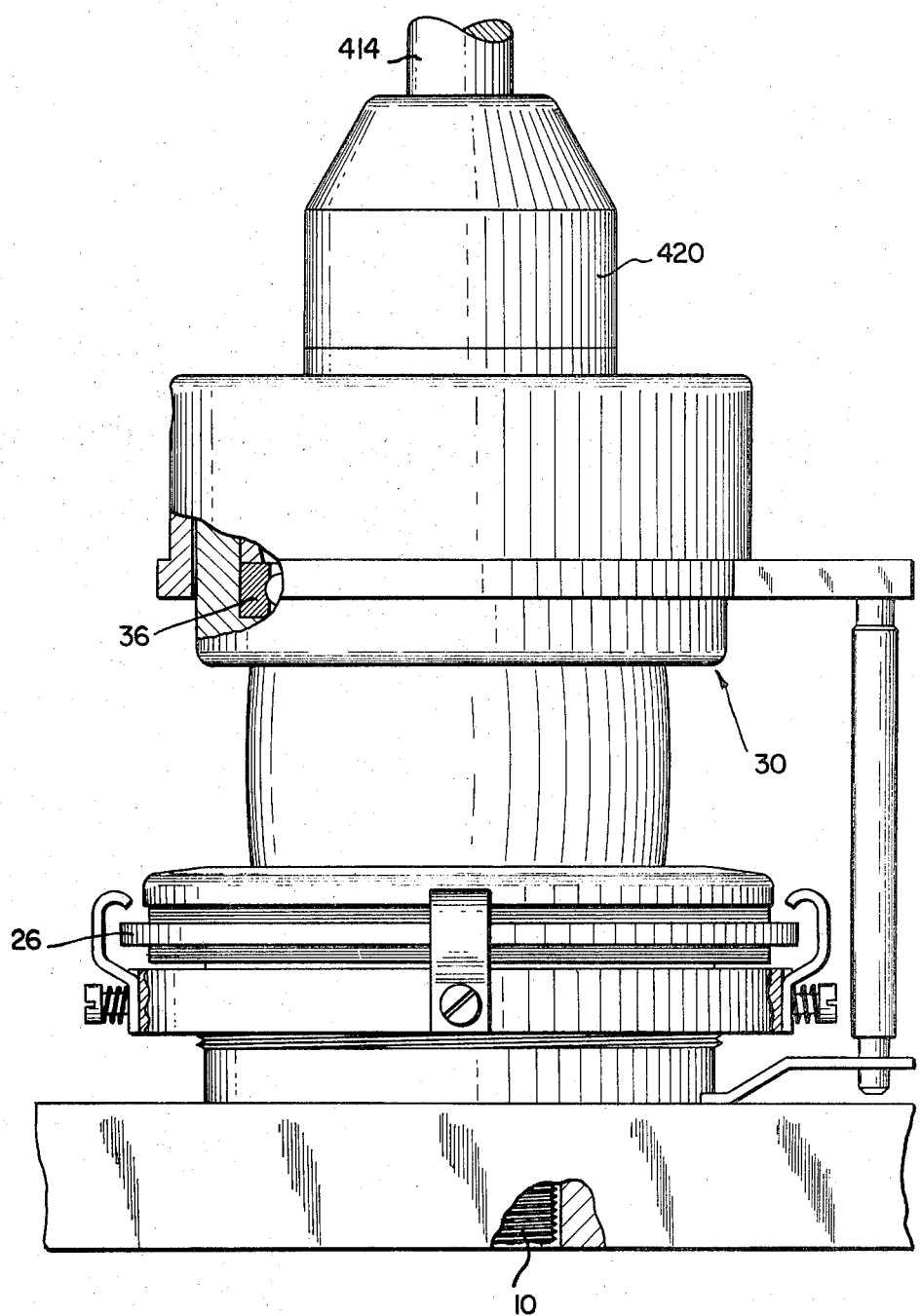

This embodiment corresponds essentially to that of FIG. 2, except that no bearings are provided between the press-fitted sleeve 324 and the shaft 314. The other fixed-sleeve member 342 need not be sectioned and is force fitted in the housing structure 350. This structure operates under the principles laid out for FIG. 3. The embodiment of FIG. 5 is identical to that of FIG. 1 except that the shaft 414 is fitted with an angularly-fixed sleeve 420 for a ring spindle. Such a ring spindle is described in the commonly assigned U.S. Pat. No. 3,388,544 issued on June 18, 1968 to E. Hammel and entitled "Multiple-Thread Monitor for Bobbin-Building Mechanism and the Like." No flyer is provided, only a flange 483 to mount the spindle 420.

What is claimed is:

1. A spindle-mounting assembly for thread-twisting and thread-spinning machines comprising:
   a baseplate;
   an axially extending nonrotatable shaft fixed to said baseplate;
   a shaft member mounted on said shaft and rotatable thereon about its axis;
   an angularly fixed annular body coaxial with and radially spaced outwardly from said shaft member;
   an annular member rotatable about said axis, said annular member being coaxial with and radially spaced outwardly from said body;
   at least one rolling-element bearing between said body and one of said members;
   drive means for rotating said one of said members about said axis; and
   clutch means between said members for releasably rotationally coupling same.

2. The assembly defined in claim 1 wherein said one of said members is said annular member, said clutch means including an axially displaceable clutch disk angularly fixed relative to said shaft member, said disk being frictionally engageable with said member, said means for rotating including a belt engageable with a surface of said member.

3. The assembly defined in claim 2 wherein said belt engages said surface with a plane of symmetry substantially perpendicular to said axis, said assembly including a pair of such bearings symmetrically arranged with one bearing to each side of said plane.

4. The assembly defined in claim 3, further comprising at least one second rolling-element bearing between said body and said shaft member.

5. The assembly defined in claim 4 wherein said assembly has a pair of such second bearings symmetrically arranged with one bearing to each side of said plane.

6. The assembly defined in claim 2, further comprising at least one second rolling-element bearing between said body and said shaft member.

7. The assembly defined in claim 2, further comprising stop means operationally engageable with said shaft member for blocking axial displacement of said shaft member beyond a predetermined limit.

8. The assembly defined in claim 7 wherein said stop means comprises at least one axially nondisplaceable hook engageable with said clutch disk on displacement of same in one axial direction beyond said predetermined limit.

9. The assembly defined in claim 8 wherein said stop means further comprises at least one washer axially fixed on said shaft member and operatively blockingly engageable with said disk on displacement of same beyond said limit.

10. The assembly defined in claim 2, further comprising a housing substantially enclosing said assembly and forming said annular member.

11. A spindle-mounting assembly comprising:
   a baseplate;
   an axially extending nonrotatable shaft fixed to said baseplate;
   a shaft member mounted on said shaft and rotatable thereon about its axis and adapted to mount a spindle;
   an angularly fixed annular body coaxial with and radially spaced outwardly from said shaft member;
   an annular member rotatable about said axis, said annular member being coaxial with and radially spaced outwardly from said body;
   at least one rolling-element bearing having an outer race fixed on said annular member and an inner race fixed on said body;
   means engageable with said annular member including a belt for rotating said annular member about said axis;
   a clutch including a clutch disk operatively coupled to said shaft for axial displacement relative thereto and joint rotation therewith, compressible spring means for urging said disk into frictional driving engagement with said annular member, and electromagnetic coil means for drawing said disk out of engagement with said annular member; and
   stop means operatively engageable with said disk for preventing axial displacement of said shaft member relative to said body beyond a predetermined limit.

* * * * *